(12) United States Patent
Wang

(10) Patent No.: US 7,957,126 B2
(45) Date of Patent: Jun. 7, 2011

(54) TRANSMISSION STRUCTURE, INPUT DEVICE, AND DATA PROCESSING SYSTEM

(75) Inventor: Yi Chen Wang, Tainan County (TW)

(73) Assignee: Darfon Electronics Corp., Gueishan, Taoyuan (TW)

( * ) Notice: Subject to any disclaimer, the term of this patent is extended or adjusted under 35 U.S.C. 154(b) by 69 days.

(21) Appl. No.: 12/632,851

(22) Filed: Dec. 8, 2009

(65) Prior Publication Data
US 2010/0142138 A1 Jun. 10, 2010

(30) Foreign Application Priority Data
Dec. 9, 2008 (TW) ............................... 97222073 U

(51) Int. Cl.
*H05K 5/00* (2006.01)
*H05K 7/00* (2006.01)
(52) U.S. Cl. ......... 361/679.13; 361/679.01; 361/679.08; 361/679.11
(58) Field of Classification Search ............. 361/679.01, 361/679.08–679.18
See application file for complete search history.

(56) References Cited

U.S. PATENT DOCUMENTS

| | | | |
|---|---|---|---|
| 7,022,927 B2 | 4/2006 | Hsu | |
| 7,034,718 B2 | 4/2006 | Hsu | |
| 7,889,483 B2 * | 2/2011 | Sip et al. | 361/679.11 |
| 2005/0078443 A1 * | 4/2005 | Lee et al. | 361/683 |
| 2009/0168317 A1 * | 7/2009 | Wang et al. | 361/679.09 |
| 2009/0312076 A1 * | 12/2009 | Lim | 455/575.4 |
| 2010/0311479 A1 * | 12/2010 | Sip et al. | 455/575.4 |

FOREIGN PATENT DOCUMENTS
TW 319438 11/1997
TW M331699 5/2008
* cited by examiner

*Primary Examiner* — Jayprakash N Gandhi
*Assistant Examiner* — Anthony M Haughton
(74) *Attorney, Agent, or Firm* — Winston Hsu; Scott Margo

(57) ABSTRACT

A transmission structure disposed in an input device of a data processing system is disclosed. The transmission structure includes a fixed plate, a movable plate, a connection member, and a motor driving unit. The fixed plate is mounted in the input device and includes a set of grooves extending toward a first direction. The movable plate is movably disposed on a first surface of the fixed plate and includes a set of first pillars to be disposed in the set of grooves. The connection member is connected to the movable plate. The motor driving unit is connected to the connection member and drives the movable plate through the connection member to move toward the first direction or a second direction opposite to the first direction.

15 Claims, 7 Drawing Sheets

TRANSMISSION STRUCTURE, INPUT DEVICE, AND DATA PROCESSING SYSTEM

BACKGROUND OF THE INVENTION

1. Field of the Invention

This invention relates to a transmission structure and an input device and a data processing system using the transmission structure.

2. Description of the Prior Art

As information develops, information equipment becomes popular. For the computers most people contact more often, there are various brands and styles of the computers in the market. They are widely popular in families, factories, companies, offices, and schools to become daily requirements. The computers in the prior art include desktop computers and notebook computers, most of which are equipped with a keyboard for users to perform operations such as characters input.

The keyswitch used in the computer keyboard mainly includes a keycap, a support member, and a rubber dome. The support member and the rubber dome are disposed between the keycap and the keyboard substrate for supporting the keycap to move vertically relative to the substrate. The common support members are mainly classified into two classes of scissors-type (such as Taiwan patent no. 319438: "KEYSWITCH WITH SCISSORS-TYPE SUPPORT MEMBER") and crater-type (such as Taiwan patent no. M331699: "KEY STRUCTURE OF KEYBOARD"). Therein, the scissors-type support member has advantages of light weight, small volume and so on, and it could therefore be used in the keyboard of portable data processing system such as notebooks or used in the membrane keyboard.

For the convenience of usage to users, researchers in the associated fields keep betaking themselves to reduce the volume and weight of the portable data processing system. So the devices or modules of the portable data processing system have to be light more. However, for the keyboard, if the thickness thereof is reduced, it may lead to the insufficient press stroke for the keyswitch, which makes operation comfort poor to users.

SUMMARY OF THE INVENTION

Accordingly, a scope of the invention is to provide a transmission structure capable of being applied to control the elevating of an input device of a data processing system so that the data processing system could be lighter and a user could feel comfortable when operating the input device.

The transmission structure of the invention could be disposed in the input device of the data processing system. The transmission structure includes a fixed plate, a movable plate, a connection member, and a motor driving unit. The fixed plate is mounted in the input device and includes a set of grooves extending toward a first direction. The movable plate is movable disposed on a first surface of the fixed plate and includes a set of first pillars movably disposed in the set of grooves respectively. The connection member is connected to the movable plate. The motor driving unit is connected to the connection member and is able to drive the movable plate through the connection member to move along the first direction or a second direction opposite to the first direction.

Another scope of the invention is to provide an input device including the above transmission structure.

The input device of the invention could be disposed in a data processing system and includes a keyswitch and a transmission structure. The keyswitch includes a keycap and a support member disposed under the keycap. The transmission structure is the same as described above. Furthermore, the movable plate of the transmission structure is connected to the support member of the keyswitch. When the motor driving unit drives the movable plate through the connection member to move along the first direction, the movable plate pushes the support member up so that the keycap rises, and when the motor driving unit drives the movable plate through the connection member to move along the second direction, the movable plate pushes the support member down so that the keycap sinks.

Another scope of the invention is to provide a data processing system including the above input device.

The data processing system of the invention includes an input device, a fixed plate, a movable plate, a connection member, and a motor driving unit. The input device includes a keyswitch which includes a keycap and a support member disposed under the keycap. The fixed plate is mounted in the input device and includes a set of grooves extending toward a first direction. The movable plate is movably disposed on a first surface of the fixed plate and includes a set of first pillars movably disposed in the set of grooves respectively. The movable plate is further connected to the support member of the keyswitch. The connection member is connected to the movable plate. The motor driving unit is connected to the connection member and is able to drive the movable plate through the connection member to move along the first direction or a second direction opposite to the first direction.

As described above, when the motor driving unit drives the movable plate through the connection member to move along the first direction, the movable plate pushes the support member up so that the keycap rises. When the motor driving unit drives the movable plate through the connection member to move along the second direction, the movable plate pushes the support member down so that the keycap sinks.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
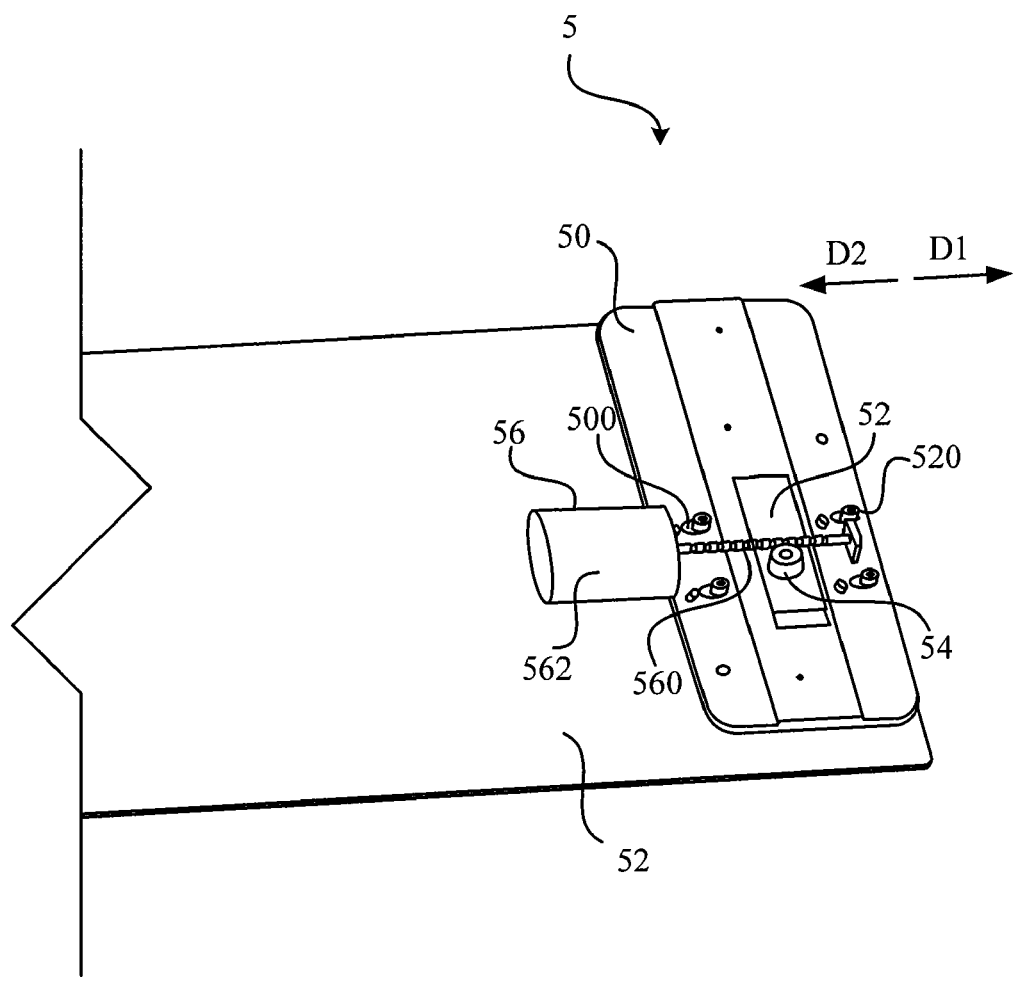
FIG. 1 is a schematic diagram of a transmission structure according to an embodiment of the invention.
Figure 2A:
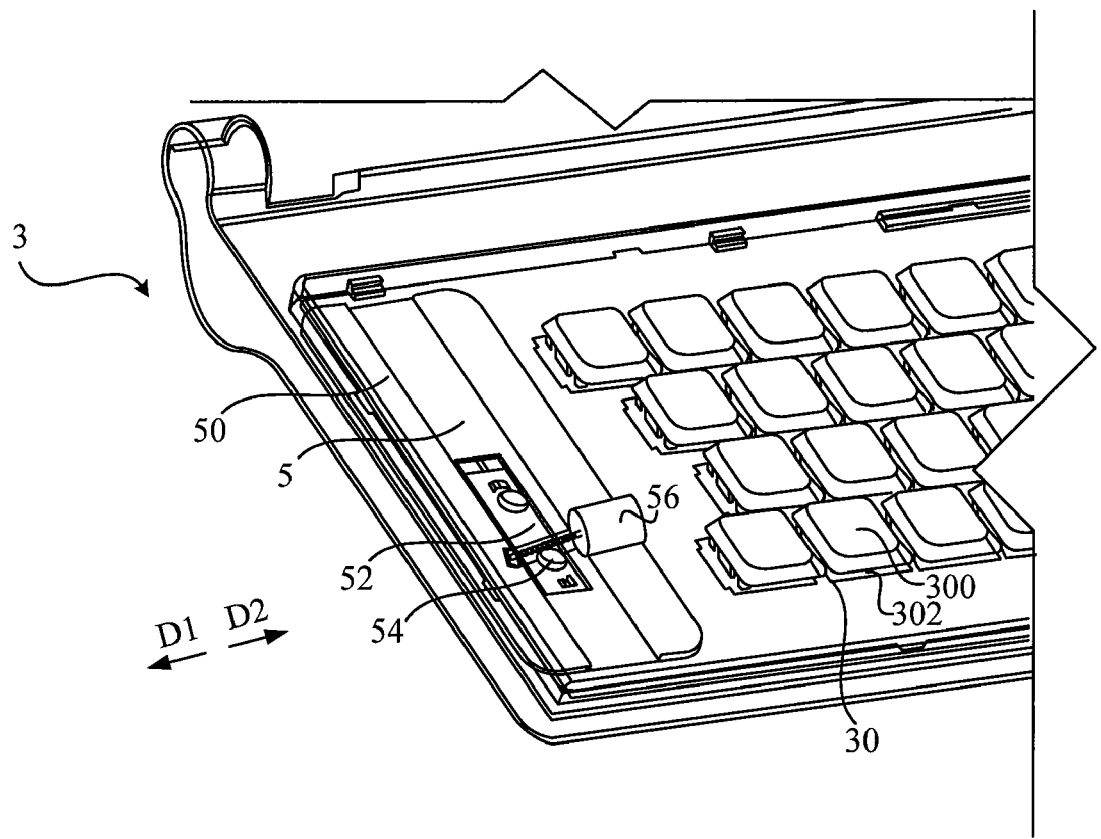
FIG. 2A is a schematic diagram of the transmission structure shown in FIG. 1 disposed in an input device driving a movable plate to move.

Please refer to FIGS. 1 and 2A. FIG. 1 is a schematic diagram of a transmission structure 5 according to an embodiment of the invention. FIG. 2A is a schematic diagram of the transmission structure 5 shown in FIG. 1 disposed in an input device 3 driving a movable plate 52 to move. As shown FIGS. 1 and 2A, in the embodiment, the transmission structure 5 includes a fixed plate 50, a movable plate 52, a connection member 54, and a motor driving unit 56. The fixed plate 50 is mounted in the input device 3 and includes a set of grooves 500 extending toward a first direction D1. The movable plate 52 is movably disposed on a first surface (not shown in the figures) of the fixed plate 50 and includes a set of first pillars 520 movably disposed in the grooves 500.

In the embodiment, the connection member 54 is connected to the movable plate 52. The connection member 54 has an engagement part thereon (not shown in the figures). The motor driving unit 56 includes a lead screw substantially parallel to the first direction D1 and a motor 562. The thread of the lead screw 560 is engaged with the engagement part of the connection member 54. The motor 562 is connected to the lead screw 560 and could drive the lead screw 560 to rotate. When the motor 562 drives the lead screw 560 to rotate, the lead screw 560 drives the engagement part and the connection member 54 to move along the lead screw 560, so that the movable plate 52 moves along the first direction D1 or a second direction D2 opposite to the first direction D1.

Figure 2B:
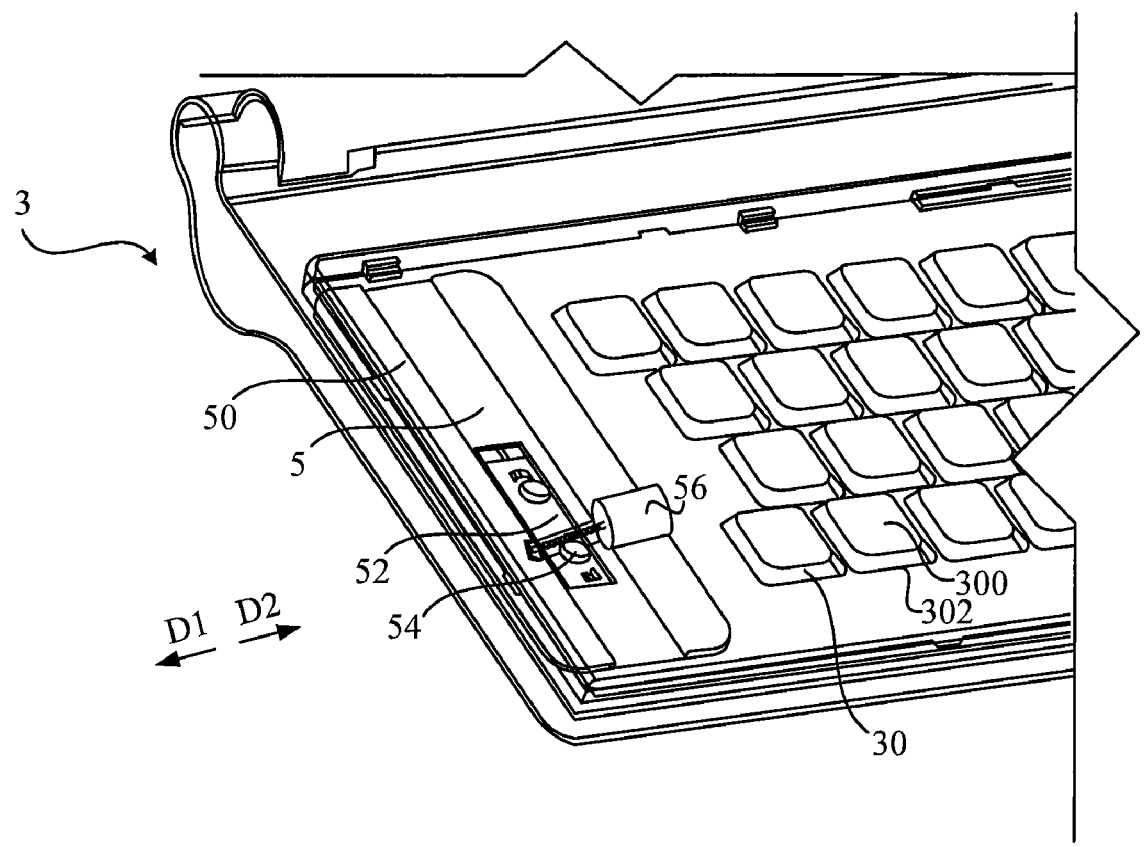
FIG. 2B is also a schematic diagram of the transmission structure shown in FIG. 1 disposed in the input device driving the movable plate to move.

Please refer to FIGS. 2A and 2B. FIG. 2B is a schematic diagram of the transmission structure 5 shown in FIG. 1 disposed in the input device 3 driving the movable plate 52 to move. As shown in FIG. 2A, the movable plate 52 is connected to a support member 302 disposed under a keycap 300 of the input device 3. When the motor driving unit 56 drives the movable plate 52 through the connection member 54 to move along the first direction D1, the movable plate 52 pushes the support member 302 up so that the keycap 300 rises. On another hand, as shown in FIG. 2B, when the motor driving unit 56 drives the movable plate 52 through the connection member 54 to move along the second direction D2, the movable plate 52 pushes the support member 302 down so that the keycap 300 sinks.

In addition, in the above embodiment, the movable plate moves along the first direction or the second direction to push the support member up or down so that the keycap rises or sinks, which is disclosed in U.S. Pat. Nos. 7,034,718 and 7,022,927 and is not described more.

Figure 3:
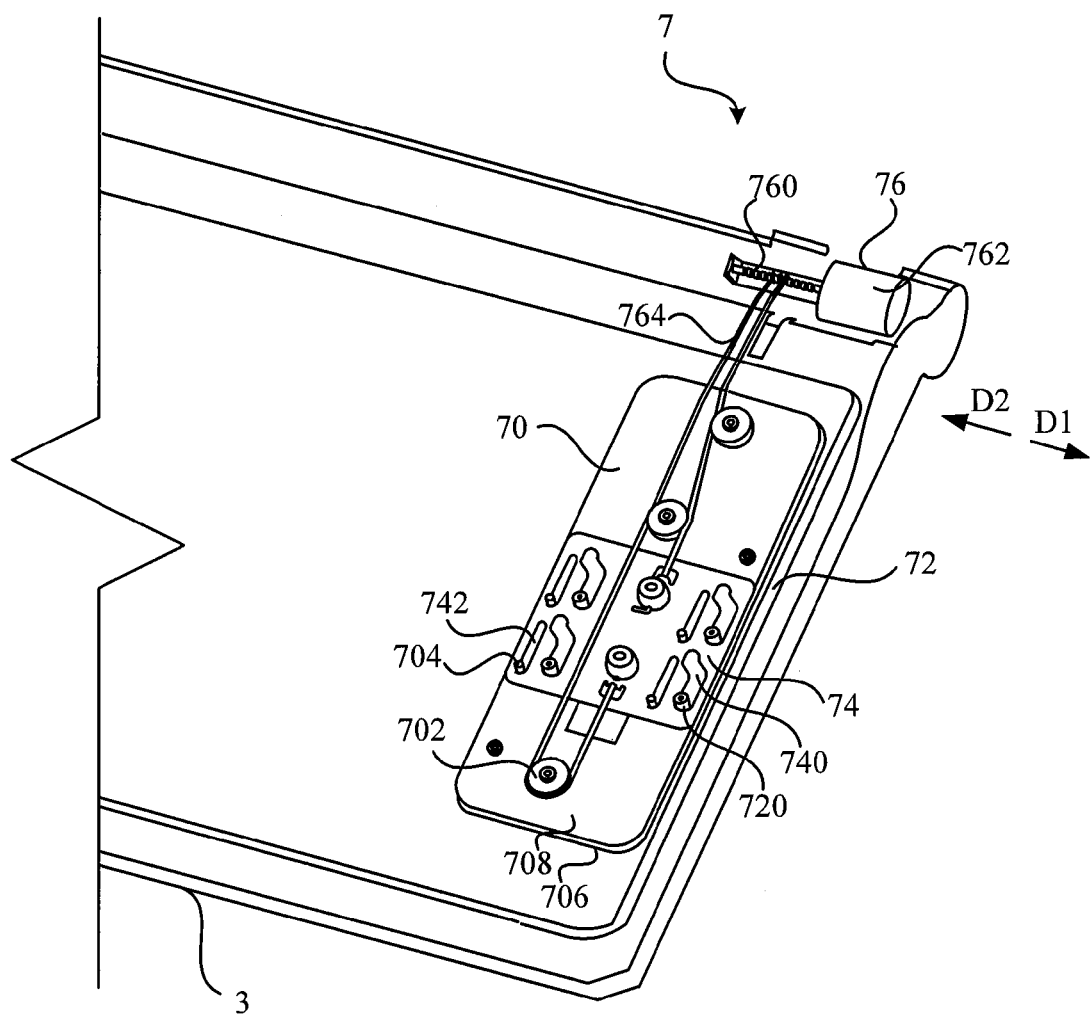
FIG. 3 is a schematic diagram of a transmission structure according to another embodiment of the invention.

Please refer to FIG. 3. FIG. 3 is a schematic diagram of a transmission structure 7 according to another embodiment of the invention. As shown in FIG. 3, in the embodiment, the transmission structure 7 includes a fixed plate 70, a movable plate 72, a connection member 74, and a motor driving unit 76. The fixed plate 70 is mounted in the input device 3 and includes a set of grooves (not shown in the figure) extending toward the first direction D1. The movable plate 72 is movably disposed on a first surface 706 of the fixed plate 70 and includes a set of first pillars 720 which are movably disposed in the set of grooves respectively. The fixed plate 70 further includes a pulley assembly 702 and a set of second pillars 704 thereon. The second pillars 704 extend outwards from a second surface 708 of the fixed plate 70 opposite to the first surface 706.

In the embodiment, the connection member 74 includes a set of first slide grooves 740 and a set of second slide grooves 742. The set of first slide grooves 740 respectively include a slanted portion. The first slide grooves 740 accommodate the first pillars 720 respectively. The second slide grooves 742 accommodate the second pillars 704 respectively. The motor driving unit 76 includes a lead screw 760, a cable 764, and a motor 762. The cable 764 wraps the lead screw 760 and being disposed on the pulley assembly 702 and connected to the connection member 74. Furthermore, the motor 762 is connected to the lead screw 760 and drives the lead screw 760 to rotate.

When the motor 762 drives the lead screw 760 to rotate, the lead screw 760 drives the cable 764 and the connection member 74 so that the connection member 74 moves along a direction of the second slide grooves 742 through the second pillars 704, and the first pillars 720 of the movable plate moves along the slanted portions of the first slide grooves 740 so that the first pillars 720 move along the first direction D1 or the second direction D2 in the set of grooves, so as to drive the movable plate 72 to move along the first direction D1 or the second direction D2.

Figure 4A:
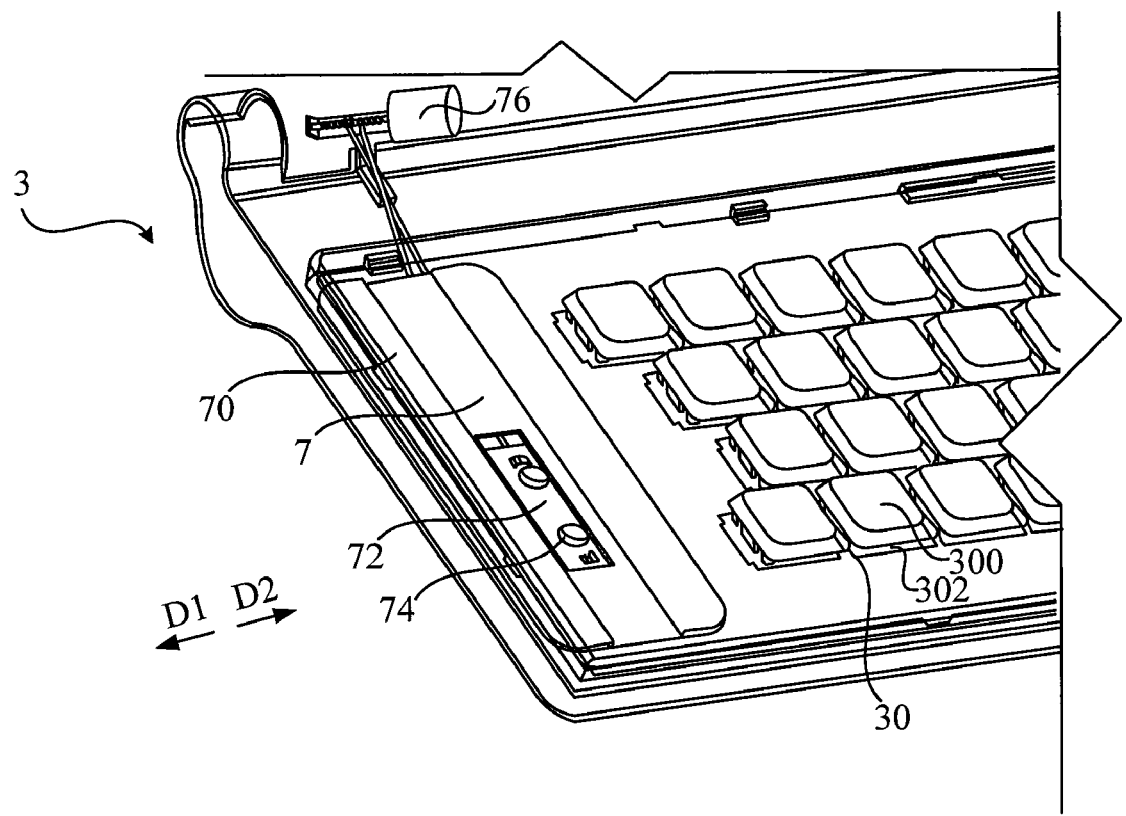
FIG. 4A is a schematic diagram of the transmission structure shown in FIG. 3 disposed in the input device driving the movable plate to move.
Figure 4B:
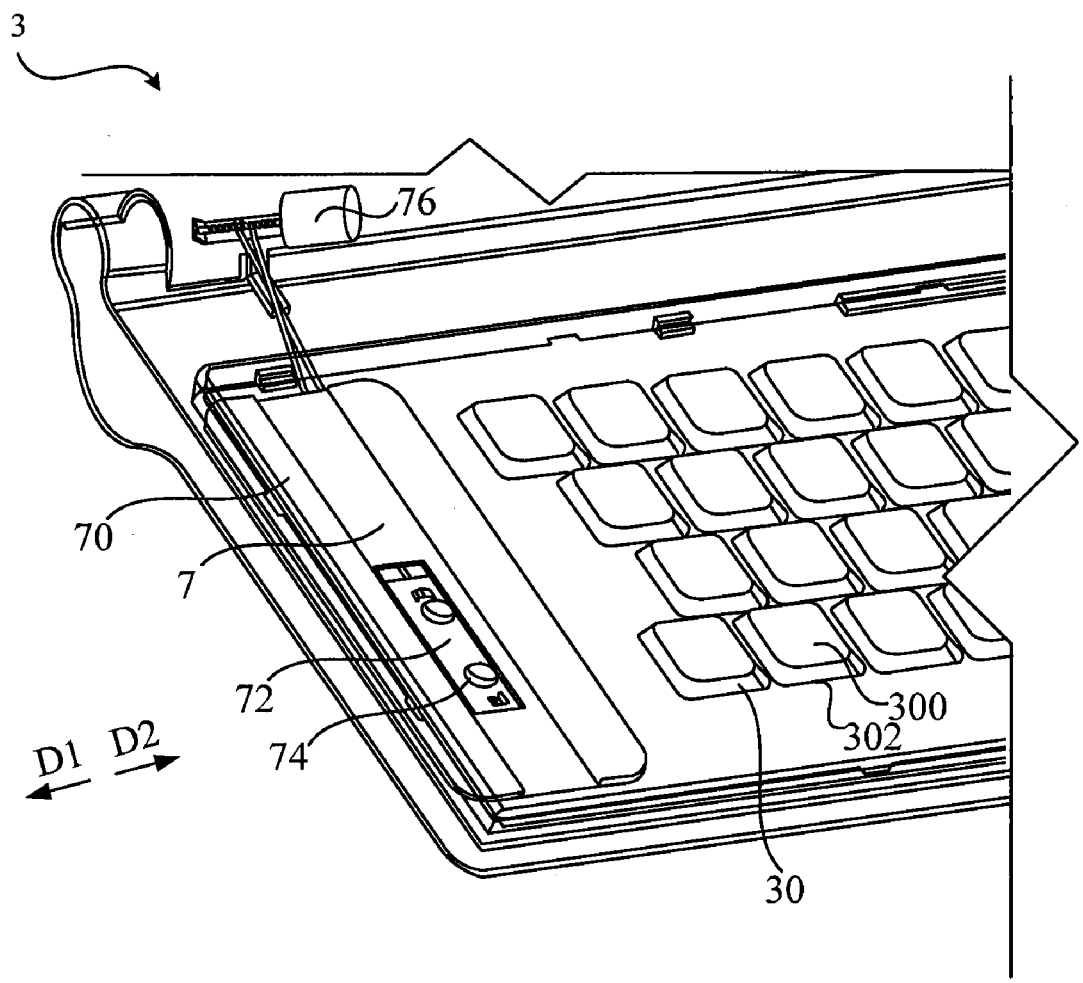
FIG. 4B is also a schematic diagram of the transmission structure shown in FIG. 3 disposed in the input device driving the movable plate to move.

Please refer to FIGS. 4A and 4B. FIG. 4A is a schematic diagram of the transmission structure 7 shown in FIG. 3 disposed in the input device 3 driving the movable plate 72 to move. FIG. 4B is also a schematic diagram of the transmission structure 7 shown in FIG. 3 disposed in the input device 3 driving the movable plate 72 to move. As shown in FIG. 4A, the movable plate 72 is connected to the support member 302 disposed under the keycap 300 of the input device 3. When the motor driving unit 76 drives the movable plate 72 through the connection member 74 to move along the first direction D1, the movable plate 72 pushes the support member 302 up so that the keycap 300 rises. On another hand, as shown in FIG. 4B, when the motor driving unit 76 drives the movable plate 72 through the connection member 74 to move along the second direction D2, the movable plate 72 pushes the support member 302 down so that the keycap 300 sinks. It is noticed that, in practical applications, the relation between the movement direction of the movable plate 52 and the rising and sinking of the keycap 300 depends on design requirement or is determined by users.

Figure 5A:
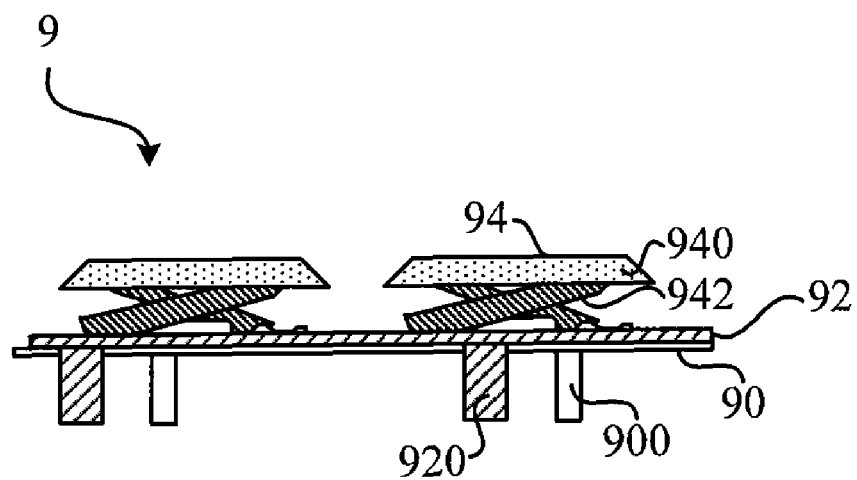
FIGS. 5A and 5B are a sectional diagram and a partial bottom view of an input device according to another embodiment.
Figure 5B:
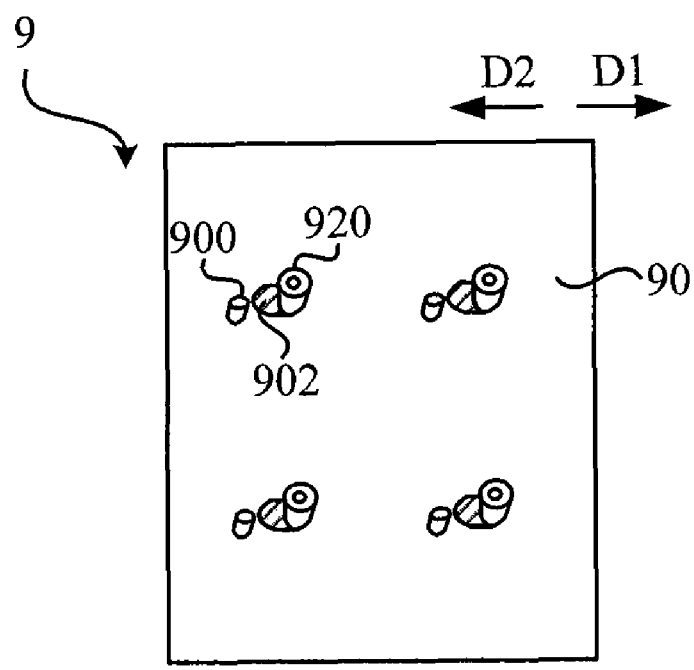

Please refer to FIGS. 5A and 5B. FIGS. 5A and 5B are a sectional diagram and a partial bottom view of an input device 9 according to another embodiment. As shown in FIGS. 5A and 5B, the input device 9 includes a fixed plate 90, a movable plate 92, and a plurality of keyswitches 94. The fixed plate 90 is mounted in the input device 9 and includes a set of second pillars 900 and a set of grooves 902. The movable plate 92 is movably disposed on the fixed plate 90 and includes a set of first pillars 920 which are movably disposed in the grooves 902 respectively. The keyswitch 94 includes a keycap 940 and a support member 942 disposed under the keycap 940.

The movable plate 92 is connected to the support member 942 of the keyswitch 94. When the movable plate 92 is driven by the motor driving unit drives (not notated in the figure) to move along the first direction D1, the movable plate 92 pushes the support member 942 up so that the keycap 940 rises. When the motor driving unit drives the movable plate 92 to move along the second direction D2, the movable plate 92 pushes the support member 942 down so that the keycap 940 sinks.

Similarly, the movable plate 92 moves along the first direction D1 or the second direction D2 to push the support member 942 up or down so that the keycap 940 rises or sinks, which is disclosed in U.S. Pat. Nos. 7,034,718 and 7,022,927 and is not described more.

According to another embodiment, the input device of the invention includes a keyswitch and the transmission structure as described in the above embodiment. The keyswitch further includes a keycap and a support member disposed under the keycap. The transmission structure includes the same elements as in the transmission structure of the above embodiment. In practice, the input device could be, but not limited to a keyboard. The movable plate of the transmission structure could be further connected to the support member, and the movement of the support member could make the support member up so that the keycap rises or sinks by the methods disclosed in U.S. Pat. Nos. 7,034,718 and 7,022,927.

In the embodiment, the motor driving unit of the transmission structure drives the movable plate through the connection member to move along the first direction, so that the movable plate pushes the support member up. On another hand, the motor driving unit of the transmission structure drives the movable plate through the connection member to move along the second direction opposite to the first direction, so that the movable plate pushes the support member down. The mechanism of the transmission structure pushing the movable plate to move along the first direction or the second direction has been described in the above embodiments and is not described more.

According to another embodiment, a data processing system (such as a notebook) of the invention includes the input device (such as a keyboard) as described in the above embodiments and a fixed plate, a movable plate, a connection member, and a motor driving unit disposed in the input device. The motor driving unit is used to drive the movable plate to move along the first direction or the second direction opposite to the first direction so as to make the keycap of the input device rise or sink. By the above mechanism, the keyswitches rise for users to press when the data processing system is in operation, and the keyswitches sink for reducing the whole thickness of the data processing system when the data processing system is out of operation, so as to enhance the portability of the data processing system.

Compared with the prior art, the transmission structure and the input device and the data processing system using the transmission structure of the invention could use motor driving to rise or sink the keyswitches of the input device, so that the whole thickness of the data processing system could be thinner to achieve the purpose of lightness and thinness, so as to enhance the portability of the data processing system. Furthermore, the user could feel comfortable in operating the input device.

With the example and explanations above, the features and spirits of the invention will be hopefully well described. Those skilled in the art will readily observe that numerous modifications and alterations of the device may be made while retaining the features and spirit of the invention. Accordingly, the above disclosure should be construed as limited only by the metes and bounds of the appended claims.

What is claimed is:

1. A transmission structure disposed in an input device of a data processing system, said transmission structure comprising:
 a fixed plate, mounted in the input device, the fixed plate comprising a set of grooves extending toward a first direction;
 a movable plate, movably disposed on a first surface of the fixed plate, the movable plate comprising a set of first pillars movably disposed in the set of grooves respectively;
 a connection member, connected to the movable plate; and
 a motor driving unit, connected to the connection member, the motor driving unit being able to drive the movable plate through the connection member to move along the first direction or a second direction opposite to the first direction.

2. The transmission structure of claim 1, wherein the connection member comprises an engagement part, and the motor driving unit further comprises:
 a lead screw, engaged with the engagement part of the connection member, an axis of the lead screw being substantially parallel to the first direction; and
 a motor, connected to the lead screw, the motor driving the lead screw to rotate;
wherein when the motor drives the lead screw to rotate, the lead screw drives the engagement part and the connection member to move along the lead screw, so that the movable plate moves along the first direction or the second direction.

3. The transmission structure of claim 1, wherein the fixed plate comprises a pulley assembly and a set of second pillars extending outwards from a second surface opposite to the first surface of the fixed plate, the connection member comprises a set of first slide grooves and a set of second slide grooves, the set of first slide grooves respectively comprise a slanted portion, the set of first slide grooves is used for accommodating the set of first pillars respectively, the set of second slide grooves is used for accommodating the set of second pillars respectively, and the motor driving unit further comprises:
 a lead screw;
 a cable wrapping the lead screw and being disposed on the pulley assembly and connected to the connection member; and
 a motor, connected to the lead screw, the motor being able to drive the lead screw to rotate;
wherein when the motor drives the lead screw to rotate, the lead screw drives the cable and the connection member so that the connection member moves along a direction of the set of second slide grooves through the set of second pillars, and the set of first pillars of the movable plate moves along the set of slanted portions of the set of first slide grooves so that the set of first pillars move along the first direction or the second direction in the set of grooves, so as to drive the movable plate to move along the first direction or the second direction.

4. The transmission structure of claim 1, wherein the movable plate is connected to a support member under a keycap of the input device.

5. The transmission structure of claim 4, wherein when the motor driving unit drives the movable plate through the connection member to move along the first direction, the movable plate pushes the support member up so that the keycap rises.

6. The transmission structure of claim 5, wherein when the motor driving unit drives the movable plate through the connection member to move along the second direction, the movable plate pushes the support member down so that the keycap sinks.

7. An input device, disposed in a data processing system, said input device comprising:
 a keyswitch, comprising a keycap and a support member disposed under the keycap; and
 a transmission structure, comprising:
  a fixed plate, mounted in the input device, the fixed plate comprising a set of grooves extending toward a first direction;
  a movable plate, movably disposed on a first surface of the fixed plate and connected to the support member, the movable plate comprising a set of first pillars movably disposed in the set of grooves respectively;
  a connection member, connected to the movable plate; and
  a motor driving unit, connected to the connection member, the motor driving unit being able to drive the movable plate through the connection member to move along the first direction or a second direction opposite to the first direction;
wherein when the motor driving unit drives the movable plate through the connection member to move along the first direction, the movable plate pushes the support member up so that the keycap rises, and when the motor driving unit drives the movable plate through the connection member to move along the second direction, the movable plate pushes the support member down so that the keycap sinks.

8. The input device of claim 7, wherein the connection member comprises an engagement part, and the motor driving unit further comprises:
- a lead screw, engaged with the engagement part of the connection member, an axis of the lead screw being substantially parallel to the first direction; and
- a motor, connected to the lead screw, the motor driving the lead screw to rotate;

wherein when the motor drives the lead screw to rotate, the lead screw drives the engagement part and the connection member to move along the lead screw, so that the movable plate moves along the first direction or the second direction.

9. The input device of claim 7, wherein the fixed plate comprises a pulley assembly and a set of second pillars extending vertically from a second surface opposite to the first surface of the fixed plate, the connection member comprises a set of first slide grooves and a set of second slide grooves, the set of first slide grooves respectively comprise a slanted portion, the set of first slide grooves is used for accommodating the set of first pillars respectively, the set of second slide grooves is used for accommodating the set of second pillars respectively, and the motor driving unit further comprises:
- a lead screw;
- a cable wrapping the lead screw and being disposed on the pulley assembly and connected to the connection member; and
- a motor, connected to the lead screw, the motor being able to drive the lead screw to rotate;

wherein when the motor drives the lead screw to rotate, the lead screw drives the cable and the connection member so that the connection member moves along a direction of the set of second slide grooves through the set of second pillars, and the set of first pillars of the movable plate moves along the set of slanted portions of the set of first slide grooves so that the set of first pillars move along the first direction or the second direction in the set of grooves, so as to drive the movable plate to move along the first direction or the second direction.

10. The input device of claim 7, wherein the input device is a keyboard.

11. A data processing system, comprising:
- an input device, comprising a keycap, the keycap comprising a keycap and a support member disposed under the keycap;
- a fixed plate, mounted in the input device, the fixed plate comprising a set of grooves extending toward a first direction;
- a movable plate, movably disposed on a first surface of the fixed plate and connected to the support member, the movable plate comprising a set of first pillars movably disposed in the set of grooves respectively;
- a connection member, connected to the movable plate; and
- a motor driving unit, connected to the connection member, the motor driving unit being able to drive the movable plate through the connection member to move along the first direction or a second direction opposite to the first direction;

wherein when the motor driving unit drives the movable plate through the connection member to move along the first direction, the movable plate pushes the support member up so that the keycap rises, and when the motor driving unit drives the movable plate through the connection member to move along the second direction, the movable plate pushes the support member down so that the keycap sinks.

12. The data processing system of claim 11, wherein the connection member comprises an engagement part, and the motor driving unit further comprises:
- a lead screw, engaged with the engagement part of the connection member, an axis of the lead screw being substantially parallel to the first direction; and
- a motor, connected to the lead screw, the motor driving the lead screw to rotate;

wherein when the motor drives the lead screw to rotate, the lead screw drives the engagement part and the connection member to move along the lead screw, so that the movable plate moves along the first direction or the second direction.

13. The data processing system of claim 11, wherein the fixed plate comprises a pulley assembly and a set of second pillars extending outwards from a second surface opposite to the first surface of the fixed plate, the connection member comprises a set of first slide grooves and a set of second slide grooves, the set of first slide grooves respectively comprise a slanted portion, the set of first slide grooves is used for accommodating the set of first pillars respectively, the set of second slide grooves is used for accommodating the set of second pillars respectively, and the motor driving unit further comprises:
- a lead screw;
- a cable wrapping the lead screw and being disposed on the pulley assembly and connected to the connection member; and
- a motor, connected to the lead screw, the motor being able to drive the lead screw to rotate;

wherein when the motor drives the lead screw to rotate, the lead screw drives the cable and the connection member so that the connection member moves along a direction of the set of second slide grooves through the set of second pillars, and the set of first pillars of the movable plate moves along the set of slanted portions of the set of first slide grooves so that the set of first pillars move along the first direction or the second direction in the set of grooves, so as to drive the movable plate to move along the first direction or the second direction.

14. The data processing system of claim 11, wherein the input device is a keyboard.

15. The data processing system of claim 11, wherein the data processing system is a notebook.

* * * * *